(12) United States Patent
Hwangbo et al.

(10) Patent No.: US 11,235,729 B2
(45) Date of Patent: Feb. 1, 2022

(54) SIDE AIRBAG FOR VEHICHLES

(71) Applicant: HYUNDAI MOBIS CO., LTD., Seoul (KR)

(72) Inventors: Sang Won Hwangbo, Yongin-si (KR); Choong Ryung Lee, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 17/081,273

(22) Filed: Oct. 27, 2020

(65) Prior Publication Data

US 2021/0122325 A1 Apr. 29, 2021

(30) Foreign Application Priority Data

Oct. 29, 2019 (KR) .......................... 10-2019-0135862

(51) Int. Cl.
*B60R 21/231* (2011.01)
*B60R 21/207* (2006.01)
*B60R 21/2338* (2011.01)
*B60R 21/239* (2006.01)
*B60R 21/26* (2011.01)

(52) U.S. Cl.
CPC ...... *B60R 21/23138* (2013.01); *B60R 21/207* (2013.01); *B60R 21/239* (2013.01); *B60R 21/2338* (2013.01); *B60R 21/26* (2013.01); *B60R 2021/23146* (2013.01); *B60R 2021/23388* (2013.01)

(58) Field of Classification Search
None
See application file for complete search history.

(56) References Cited

U.S. PATENT DOCUMENTS

| | | | | |
|---|---|---|---|---|
| 8,469,395 | B2 * | 6/2013 | Richez | B60R 21/207 280/730.2 |
| 8,485,551 | B2 * | 7/2013 | Dainese | B60R 21/207 280/730.2 |
| 9,102,300 | B2 * | 8/2015 | Faruque | B60R 21/207 |
| 2017/0144622 | A1 * | 5/2017 | Perlo | B60R 21/233 |
| 2018/0194317 | A1 * | 7/2018 | Barbat | B60N 2/90 |
| 2020/0307488 | A1 * | 10/2020 | Kondrad | B60R 21/23184 |
| 2020/0331421 | A1 * | 10/2020 | Saito | B60R 21/207 |
| 2021/0001799 | A1 * | 1/2021 | Sandinge | B60R 21/232 |
| 2021/0009074 | A1 * | 1/2021 | Wold | B60R 21/2342 |
| 2021/0146874 | A1 * | 5/2021 | Lee | B60R 21/233 |

FOREIGN PATENT DOCUMENTS

KR 10-1720983 B1 3/2017

* cited by examiner

*Primary Examiner* — Faye M Fleming
(74) *Attorney, Agent, or Firm* — NovoTechIP International PLLC

(57) ABSTRACT

Disclosed is a side airbag for vehicles including a first cushion coupled to one side of a seat, the first cushion extending from the side surface of the seat in a forward-rearward direction to cover a passenger at the side of the passenger when deployed, an inflator fixed to the seat, the inflator being configured to supply gas to the first cushion, a second cushion connected to the first cushion, the second cushion being bent from the first cushion toward the passenger and extending in a lateral direction, the second cushion being deployed by the gas supplied from the first cushion, and a support tether having one end fixedly coupled to the second cushion and the other end fixedly coupled to the seat, wherein the support tether is bent so as to be slidably coupled to the first cushion between one end and the other end thereof.

14 Claims, 7 Drawing Sheets

SIDE AIRBAG FOR VEHICLES

CROSS-REFERENCE TO RELATED APPLICATION

This application claims the benefit of Korean Patent Application No. 10-2019-0135862, filed on Oct. 29, 2019 with the Korean Intellectual Property Office, the disclosure of which is herein incorporated by reference in its entirety.

BACKGROUND OF THE INVENTION

1. Field of the Invention

The present invention relates to a side airbag for vehicles, and more particularly to a side airbag configured to extend to the front of a passenger in order to support the front of the passenger.

2. Description of the Related Art

In order to protect a passenger at the time of vehicle collision, an airbag is installed in a vehicle. The airbag is configured such that a cushion is expanded and deployed by gas pressure to protect the passenger.

Specifically, airbags are disposed at various positions in a vehicle depending on the portion of the passenger to be protected. For example, a front airbag is installed in a steering wheel, a roof airbag is installed in a roof of the vehicle, and a side airbag and a curtain airbag are installed to protect the passenger at the time of lateral vehicle collision.

Conventional side airbags have a problem in that support force of a cushion necessary to support the side of the passenger is not sufficient when deployed. In addition, there is another problem in that the side airbag is deployed only at the time of lateral vehicle collision, whereby it is difficult to sufficiently protect the passenger at the time of oblique vehicle collision. In particular, there is a further problem in that it is difficult to sufficiently protect the passenger when the passenger is obliquely loaded in a lateral direction and in a forward direction.

The matters disclosed in this section are merely for enhancement of understanding of the general background of the invention and should not be taken as an acknowledgment or any form of suggestion that the matters form the related art already known to a person skilled in the art.

SUMMARY OF THE INVENTION

The present invention has been made in view of the above problems, and it is an object of the present invention to provide a side airbag for vehicles capable of effectively reducing side and front injury of a passenger and sufficiently securing support force of a deployed cushion.

In accordance with the present invention, the above and other objects can be accomplished by the provision of a side airbag for vehicles, the side airbag including a first cushion coupled to one side of a seat, the first cushion extending from the side surface of the seat in a forward-rearward direction to cover a passenger at the side of the passenger when deployed, an inflator fixed to the seat, the inflator being configured to supply gas to the first cushion such that the first cushion is deployed, a second cushion connected to the first cushion at a position at which the second cushion is spaced apart from the inflator in a forward direction, the second cushion being bent from the first cushion toward the passenger and extending in a lateral direction, the second cushion being deployed by the gas supplied from the first cushion, and a support tether having one end fixedly coupled to the second cushion and the other end fixedly coupled to the seat, wherein the support tether is bent so as to be slidably coupled to the first cushion between one end and the other end thereof.

The support tether may be slidably coupled to the first cushion at a position at which the support tether is spaced apart from the inflator in the forward direction.

The side airbag may further include a fastening tether having opposite ends integrally coupled to the first cushion, wherein the support tether may extend through a gap between the fastening tether and the first cushion so as to be slidably coupled to the first cushion between one end and the other end thereof.

The fastening tether may extend in an upward-downward direction, and the upper end and the lower end of the fastening tether may be coupled to the side of the first cushion adjacent to the passenger.

The side airbag may further include a fastening ring fixedly coupled to the side of the first cushion adjacent to the passenger, the fastening ring having a sliding hole formed therein, wherein the support tether may extend through the sliding hole so as to be slidably coupled to the fastening ring.

A blocking portion may be formed at the support tether between one end and the other end thereof, the blocking portion being caught by the first cushion at a specific position to block sliding of the support tether in one direction.

The blocking portion may be a knot of the support tether formed so as to be caught by a sliding hole provided in the first cushion such that the support tether is slidable.

The second cushion may be bent from the first cushion along a bending line extending in the upward-downward direction, and the first cushion and the second cushion may be separated from each other in a portion of the bending line.

The second cushion may communicate with the first cushion via a vent hole, and the second cushion may be deployed by the gas supplied from the first cushion in the state in which the first cushion is completely deployed.

The seat may include a seat back frame and a seat back cushion located in front of the seat back frame, and the support tether may extend between the seat back cushion and the seat back frame so as to push the seat back cushion forwards when the first cushion is deployed.

The support tether may extend from one end thereof, located at one side of the seat, in the lateral direction, and the other end of the support tether may be coupled to the seat back frame at the other side of the seat.

A first side panel may be coupled to the seat back frame, the first side panel extending forwards from one end of the seat back frame such that the inflator or the first cushion is fixed to the first side panel, and the support tether may extend in front of the first side panel.

A second side panel may be coupled to the seat back frame, the second side panel extending forwards from the other end of the seat back frame, and the support tether may be coupled to the second side panel or the other end of the seat back frame.

The first cushion may be partitioned into a head protection portion configured to protect a head of the passenger and a body protection portion configured to protect a body of the passenger, and the inflator may be connected to the body protection portion to supply gas to the first cushion.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Figure 1:
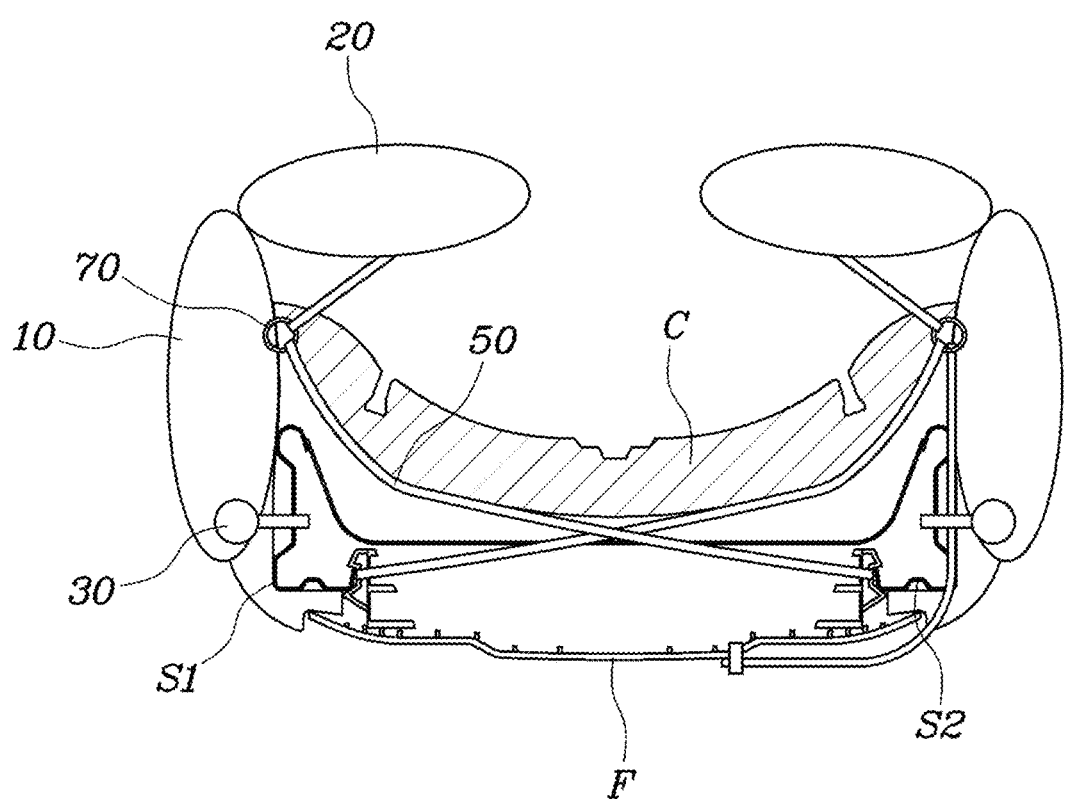
FIG. 1 is a view showing a side airbag for vehicles according to an embodiment of the present invention.

Specific structural or functional descriptions of the embodiments of the present invention disclosed in this specification or this disclosure are given only for illustrating embodiments of the present invention. Embodiments of the present invention may be realized in various forms, and should not be interpreted to be limited to the embodiments of the present invention disclosed in this specification or this disclosure.

Since the embodiments of the present invention may be variously modified and may have various forms, specific embodiments will be shown in the drawings and will be described in detail in this specification or this disclosure. However, the embodiments according to the concept of the present invention are not limited to such specific embodiments, and it should be understood that the present invention includes all alterations, equivalents, and substitutes that fall within the idea and technical scope of the present invention.

It will be understood that, although the terms "first", "second", etc. may be used herein to describe various elements, corresponding elements should not be understood to be limited by these terms, which are used only to distinguish one element from another. For example, within the scope defined by the present invention, a first element may be referred to as a second element, and similarly, a second element may be referred to as a first element.

It will be understood that, when a component is referred to as being "connected to" or "coupled to" another component, it may be directly connected to or coupled to the other component, or intervening components may be present. In contrast, when a component is referred to as being "directly connected to" or "directly coupled to" another component, there are no intervening components present. Other terms that describe the relationship between components, such as "between" and "directly between" or "adjacent to" and "directly adjacent to", must be interpreted in the same manner.

The terms used in this specification are provided only to explain specific embodiments, but are not intended to restrict the present invention. A singular representation may include a plural representation unless it represents a definitely different meaning from the context. It will be further understood that the terms "comprises", "has" and the like, when used in this specification, specify the presence of stated features, numbers, steps, operations, elements, components or combinations thereof, but do not preclude the presence or addition of one or more other features, numbers, steps, operations, elements, components, or combinations thereof.

Unless otherwise defined, all terms, including technical and scientific terms, used in this specification have the same meanings as those commonly understood by a person having ordinary skill in the art to which the present invention pertains. It will be further understood that terms, such as those defined in commonly used dictionaries, should be interpreted as having meanings consistent with their meanings in the context of the relevant art and the present disclosure, and are not to be interpreted in an idealized or overly formal sense unless expressly so defined herein.

Reference will now be made in detail to the preferred embodiments of the present invention, examples of which are illustrated in the accompanying drawings. Wherever possible, the same reference numbers will be used throughout the drawings to refer to the same or like parts.

Figure 2:
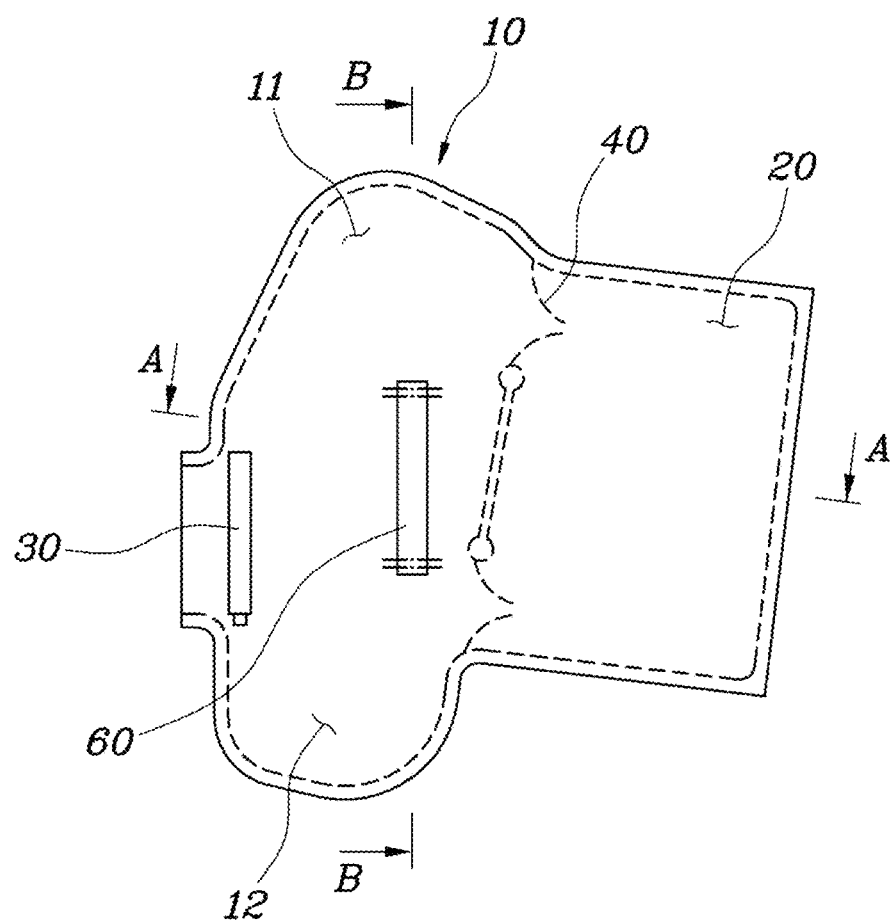
FIG. 2 is a sectional view of the side airbag for vehicles according to the embodiment of the present invention.
Figure 3:
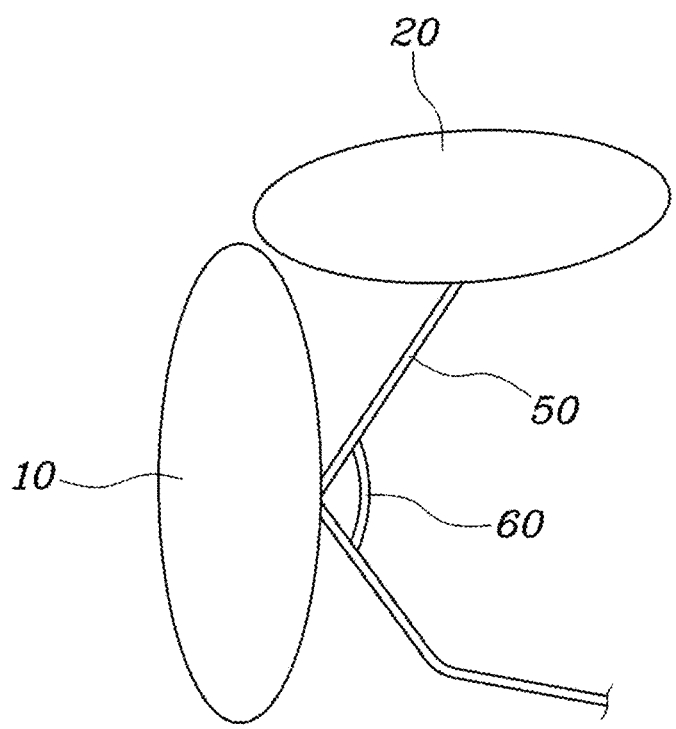
FIGS. 3 and 4 are sectional views of the side airbag for vehicles according to the embodiment of the present invention taken along line A-A and line B-B of FIG. 2, respectively.
Figure 4:
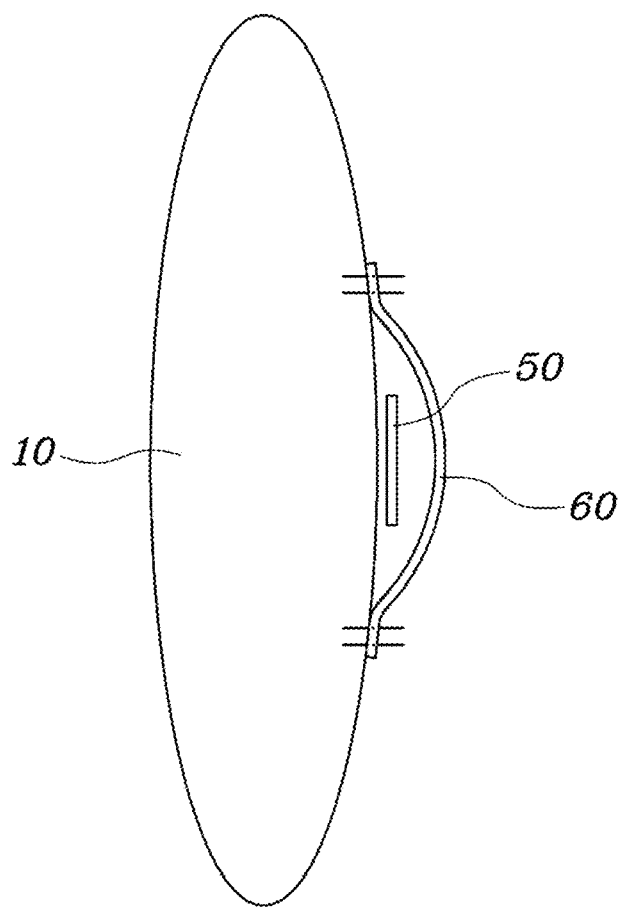

FIG. 1 is a view showing a side airbag for vehicles according to an embodiment of the present invention, FIG. 2 is a sectional view of the side airbag for vehicles according to the embodiment of the present invention, and FIGS. 3 and 4 are sectional views of the side airbag for vehicles according to the embodiment of the present invention taken along line A-A and line B-B of FIG. 2, respectively.

Referring to FIGS. 1 to 4, the side airbag for vehicles according to the embodiment of the present invention includes a first cushion 10 coupled to one side of a seat, the first cushion 10 extending from the side surface of the seat in a forward-rearward direction to cover a passenger at the side of the passenger when deployed, an inflator 30 fixed to the seat, the inflator 30 being configured to supply gas to the first cushion 10 such that the first cushion 10 is deployed, a second cushion 20 connected to the first cushion 10 at a position at which the second cushion 20 is spaced apart from the inflator 30 in a forward direction, the second cushion 20 being bent from the first cushion 10 toward the passenger and extending in a lateral direction, the second cushion 20 being deployed by the gas supplied from the first cushion 10, and a support tether 50 having one end fixedly coupled to the second cushion 20 and the other end fixedly coupled to the seat, wherein the support tether 50 is bent so as to be slidably coupled to the first cushion 10 between one end and the other end thereof.

The side airbag for vehicles according to the embodiment of the present invention may be deployed at the time of front or rear vehicle collision as well as at the time of lateral vehicle collision. That is, the side airbag for vehicles according to the embodiment of the present invention may simultaneously support the front and the side of the passenger, whereby it is possible to protect the passenger using a shape enveloping the passenger in the seat.

The first cushion 10 may be coupled to one side of the seat, and the second cushion 20 may be coupled and connected to the first cushion 10. The first cushion 10 and the second cushion 20 may be surrounded by a single cover. The interiors of the first cushion 10 and the second cushion 20 may be expanded by the gas supplied from the inflator 30, whereby the first cushion 10 and the second cushion 20 may be deployed.

One side of the first cushion 10 may be fixedly coupled to a first side panel S1 of a seat back. The inflator 30 may be connected to the first cushion 10 at one side of the first cushion 10, or may be located in the first cushion 10. The first cushion 10 may be deployed so as to extend in the forward-rearward direction.

The second cushion 20 may be coupled and connected to the first cushion 10 at the other side of the first cushion 10 spaced apart from the inflator 30 in the forward-rearward direction. The second cushion 20 may be expanded and deployed by the gas supplied from first cushion 10. In particular, the second cushion 20 may be bent from the first cushion 10 in the lateral direction, and may extend to the front of the passenger.

The inflator 30 may be fixedly coupled to the first side panel S1 of the seat back together with one side of the first cushion 10. Upon receiving a vehicle collision signal, the inflator 30 may generate gas through explosion of gunpowder and may supply the gas to the first cushion 10.

The support tether 50 may bend the second cushion 20 rearwards based on the first cushion 10 while interconnecting the second cushion 20 and the seat. In particular, the support tether 50 may extend between one end and the other end thereof via the first cushion 10.

The support tether 50 may be slidably coupled to the first cushion 10, may be supported by coupling with the first cushion 1, and may be bent between one end and the other end thereof.

Consequently, the first cushion 10 and the second cushion 20 may be simultaneously supported by a single tether, and the first cushion 10, configured to cover the side of the passenger, and the second cushion 20, configured to cover the front of the passenger, may be rotated in the state of being interlocked by the support tether 50.

Figure 5:
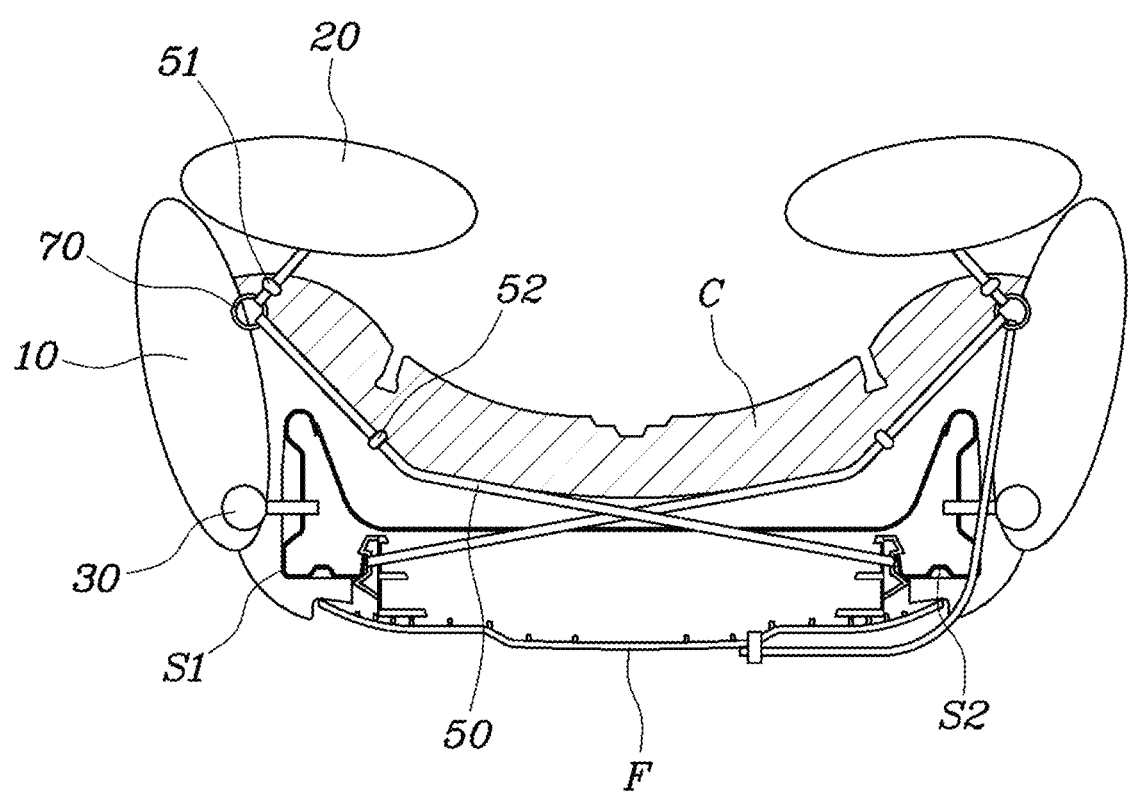
FIGS. 5 and 6 are views showing the state in which the pressure of a passenger is applied to the side airbag for vehicles according to the embodiment of the present invention.
Figure 6:
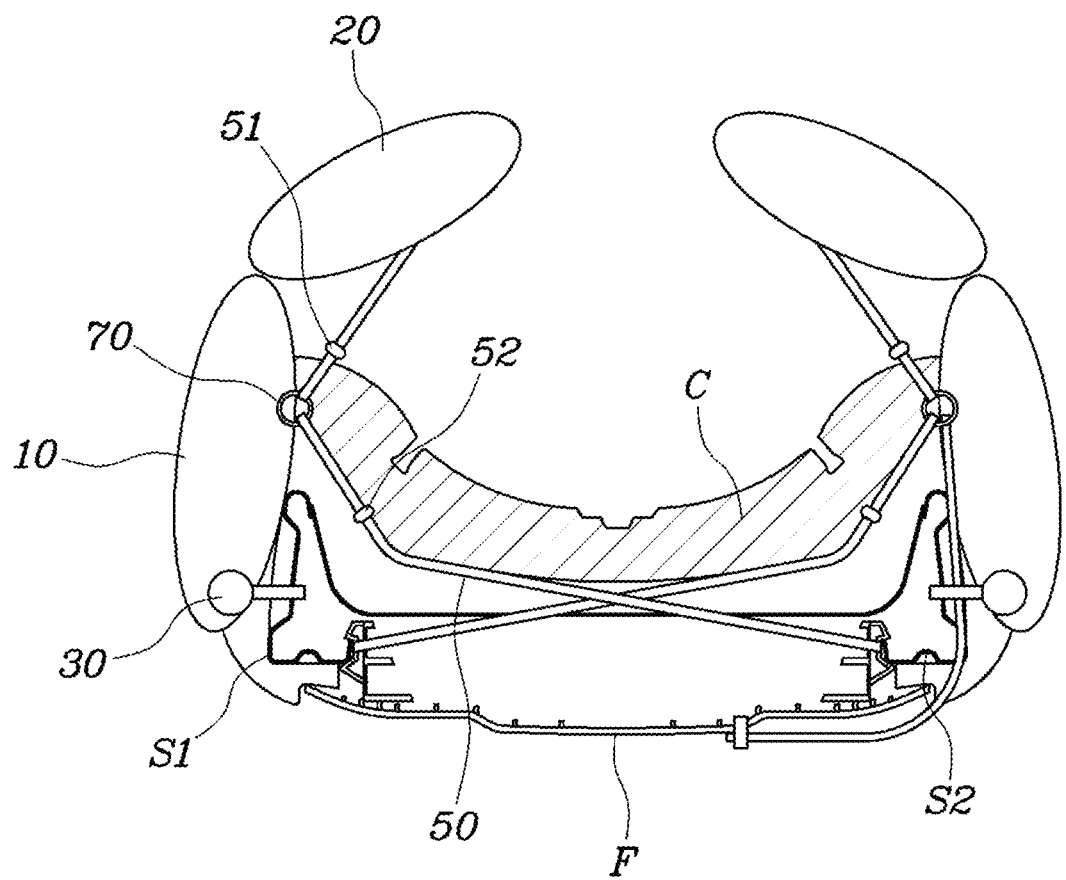

FIGS. 5 and 6 are views showing the state in which the pressure of the passenger is applied to the side airbag for vehicles according to the embodiment of the present invention.

Referring further to FIGS. 5 and 6, in the case in which the passenger is loaded in the lateral direction to apply pressure to the first cushion 10 in the lateral direction, tensile force generated by the support tether 50 may be increased, as shown in FIG. 5.

As a result, support force may be applied to the second cushion 20 by the support tether 50 such that the second cushion 20 is moved to the passenger, whereby the second cushion 20 may be brought into tight contact with the front of the passenger. Consequently, it is possible to effectively limit the behavior of the passenger.

In the case in which the passenger is loaded in the forward direction to apply pressure to the second cushion 20 in the forward direction, tensile force generated by the support tether 50 may be increased, as shown in FIG. 6.

As a result, support force may be applied to the first cushion 10 by the support tether 50 such that the first cushion 10 is moved to the passenger, whereby the first cushion 10 may be brought into tight contact with the side of the passenger. Consequently, it is possible to effectively limit the behavior of the passenger.

That is, in the case in which the first cushion 10 or the second cushion 20 is pressurized as the passenger is loaded in the forward direction or in the lateral direction, the first cushion 10 and the second cushion 20 may be rotated in an interlocked state by the support tether 50, whereby the first cushion 10 and the second cushion 20 may be brought into tight contact with the passenger. Consequently, it is possible to effectively limit the behavior of the passenger to thus reduce injury of the passenger.

The support tether 50 may be slidably coupled to the first cushion 10 at a position at which the support tether 50 is spaced apart from the inflator 30 in the forward direction.

Support force may be applied to the first cushion 10 in the lateral direction by tensile force of the support tether 50 slidably coupled thereto. Since the inflator 30 and one end of the first cushion 10 are fixed to the seat, the support tether 50 may apply support force to the first cushion 10 in the lateral direction in front of the inflator 30, whereby rotational force necessary to rotate the first cushion 10 toward the passenger may be increased.

In an embodiment, as shown in FIGS. 2 to 4, a fastening tether 60 having opposite ends integrally coupled to the first cushion 10 may be further included. The support tether 50 may extend through a gap between the fastening tether 60 and the first cushion 10 so as to be slidably coupled to the first cushion 10 between one end and the other end thereof.

Specifically, the fastening tether 60 may extend in an upward-downward direction, and the upper end and the lower end of the fastening tether 60 may be coupled to the side of the first cushion 10 adjacent to the passenger.

Opposite ends of the fastening tether 60 are integrally coupled to the first cushion 10. Between the opposite ends thereof, the fastening tether 60 may be separated from the first cushion 10, whereby a ring-shaped sliding hole may be formed between the fastening tether 60 and the first cushion 10. The support tether 50 may be slidably coupled to the first cushion 10 in the state of extending through the sliding hole formed between the fastening tether 60 and the first cushion 10. When tensile force is generated by the support tether 50, the support tether 50 may apply support force to the first cushion 10 in the lateral direction while being supported by the fastening tether 60.

The fastening tether 60 may be made of a material identical or similar to cloth of which the support tether 50, the cover, or each cushion is made. When the first cushion 10 or the second cushion 20 is deployed, therefore, it is possible to minimize injury of the passenger.

In another embodiment, as shown in FIG. 1, a fastening ring 70 fixedly coupled to the side of the first cushion 10 adjacent to the passenger, the fastening ring 70 having a sliding hole formed therein, may be further included. The support tether 50 may extend through the sliding hole so as to be slidably coupled to the fastening ring 70.

The fastening ring 70 may be made of a material, such as plastic, metal, or cloth, and may have any of various shapes, such as an O shape and an S shape. One side of the fastening ring 70 may be coupled to the first cushion 10, and the other side of the fastening ring 70 may be coupled to the support tether 50. Consequently, tensile force of the support tether 50 may be transmitted to the first cushion 10, whereby support force may be applied in the lateral direction.

Blocking portions 51 and 52 may be formed at the support tether 50 between one end and the other end thereof. The blocking portions 51 and 52 may be caught by the first cushion 10 at specific positions to block sliding of the support tether 50 in one direction.

Specifically, the blocking portions 51 and 52 may be formed between one end and the other end of the support tether 50 to block sliding of the support tether 50 relative to the first cushion 10. That is, the blocking portions 51 and 52 may limit the range within which the support tether 50 slides relative to the first cushion 10.

The blocking portions 51 and 52 may block upward sliding of the support tether 50 or downward sliding of the support tether 50 based on the first cushion 10. Alternatively, the blocking portions 51 and 52 may be formed so as to be spaced apart from the position at which the support tether 50 is coupled to the first cushion 10 in order to block upward and downward sliding of the support tether 50. Consequently, sliding of the support tether 50 relative to the first cushion 10 may be allowed only within a predetermined range of the support tether 50.

In particular, the diameter of each of the blocking portions 51 and 52 may be increased such that the blocking portions 51 and 52 are caught by the sliding hole of the fastening ring 70 coupled to the first cushion 10 or the sliding hole between the fastening tether 60 and the first cushion without passing therethrough.

In an embodiment, the blocking portions 51 and 52 may be knots 51 and 52 of the support tether 50 formed so as to be caught by the sliding hole provided in the first cushion such that the support tether 50 is slidable.

The knots 51 and 52 may be formed at specific positions of the support tether 50 between one end and the other end thereof to block sliding of the support tether 50 relative to the first cushion 10. The diameter of each of the knots 51 and 52 may be greater than the diameter of the sliding hole.

In another embodiment, each of the blocking portions and 52 may be a separate bar-shaped member having a diameter greater than the diameter of the sliding hole or extending so as to have a length greater than the diameter of the sliding hole.

The second cushion 20 may be bent from the first cushion 10 along a bending line extending in the upward-downward direction. The first cushion 10 and the second cushion 20 may be separated from each other in a portion of the bending line.

A bending line extending in the upward-downward direction may be formed between the first cushion 10 and the second cushion 20, and the second cushion 20 may be bent from the first cushion 10 along the bending line in the lateral direction. In particular, the first cushion 10 and the second cushion 20 may be separated from each other in a portion of the bending line and may be connected to each other in the remaining portion of the bending line, although the first cushion 10 and the second cushion 20 may be connected to each other over the entirety of the bending line.

The cover configured to simultaneously wrap the first cushion 10 and the second cushion 20 may have a pattern in which inner surfaces of the first cushion 10 and the second cushion 20 are coupled to each other between the first cushion 10 and the second cushion 20 separated from each other, and the interiors of the first cushion 10 and the second cushion 20 may communicate with each other in only a portion of the bending line.

In an embodiment, the first cushion 10 and the second cushion 20 may be separated from each other at the middle part of each thereof in the upward-downward direction so as to be partially spaced apart from each other, and may communicate with each other at the upper end and the lower end of each thereof such that the gas is supplied from the first cushion 10 to the second cushion 20. As a result, the second cushion 20 may be bent in the lateral direction while not being inclined from the first cushion 10 upwards or downwards.

Consequently, the second cushion 20 may be deployed after the first cushion 10 is deployed. That is, the first cushion 10, configured to protect the side of the passenger, may be deployed first, and then the second cushion 20 may be deployed after delay.

The first cushion 10 and the second cushion 20 may communicate with each other only at any one of the upper end and the lower end of each thereof.

In another embodiment, the second cushion 20 may communicate with the first cushion 10 via a vent hole 40, and the second cushion 20 may be deployed by the gas supplied from the first cushion 10 in the state in which the first cushion 10 is completely deployed.

In the case in which pressure in the first cushion is less than a predetermined value, the vent hole 40 may be closed. Only in the case in which pressure in the first cushion is equal to or greater than the predetermined value, the vent hole 40 may be opened to allow the gas to be supplied from the first cushion 10 to the second cushion 20. Consequently, deployment of the second cushion 20 may be delayed such that the second cushion 20 starts to be deployed after the first cushion 10 is completely deployed.

The support tether 50 may interconnect the first cushion 10 and the seat back. Consequently, the support tether 50 may apply tensile force to the first cushion 10 in a direction toward the passenger, whereby the first cushion 10 may be supported so as not to be rotated in a direction in which the first cushion 10 is spaced apart from the passenger.

In particular, one end of the support tether 50 may be coupled to the first cushion 10 at a position at which the support tether 50 is spaced apart from the inflator 30 in the forward direction, and may be coupled to the first cushion 10 at a position at which the support tether 50 is spaced apart further rearwards than a position at which the support tether 50 is coupled to the second cushion 20.

In addition, the other end of the support tether 50 may be coupled to the seat (specifically, the seat back), and may be coupled to a seat back frame F, whereby support force of the support tether 50 may be increased.

The seat includes a seat back frame F and a seat back cushion C located in front of the seat back frame F. The support tether 50 may extend between the seat back cushion C and the seat back frame F so as to push the seat back cushion C forwards when the first cushion 10 is deployed.

The seat back cushion C may be located in front of the seat back frame F, whereby the seat back frame F may support the seat back cushion C at the rear thereof. The seat back frame F may have a suspension structure, by which the seat back cushion C may be supported.

The other end of the support tether 50 may be coupled to the seat back frame F in the state in which the support tether 50 extends between the seat back cushion C and the seat back frame F. When one end of the support tether 50 is pulled forwards as the first cushion 10 is deployed, therefore, tensile force may be generated by the support tether 50, whereby the support tether 50 may push the seat back cushion C forwards while wrapping the seat back cushion C at the rear thereof.

That is, the seat back cushion C may be moved forwards while being pushed forwards. As a result, the seat back cushion C may be brought into tight contact with the passenger at the rear of the passenger, whereby the behavior of the passenger may be limited.

Figure 7:
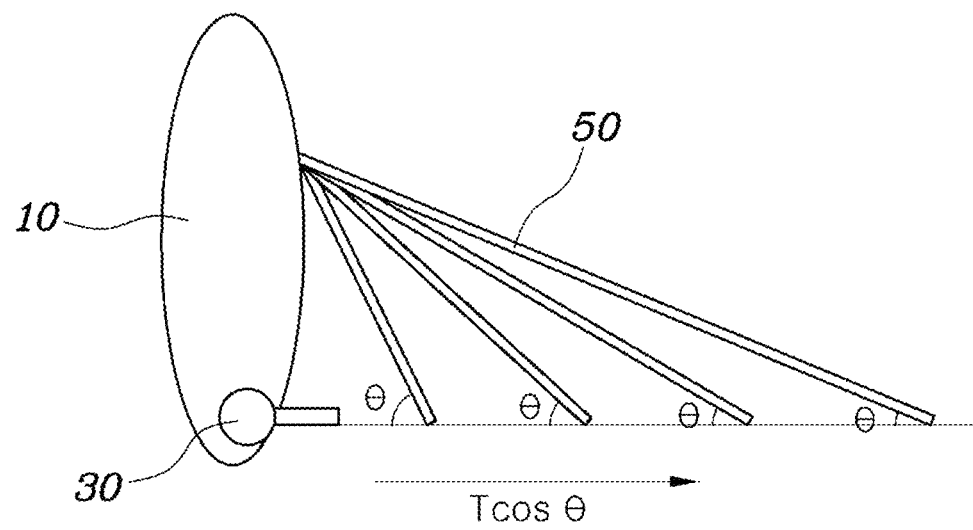
FIG. 7 is a view showing support force of a support tether according to an embodiment of the present invention based on the direction in which tensile force thereof is applied.

FIG. 7 is a view showing support force of the support tether 50 according to the embodiment of the present invention based on the direction in which tensile force thereof is applied.

Referring to FIG. 7, as the other end of the support tether 50 is spaced apart from one end thereof, which is coupled to the first cushion 10, in the lateral direction, $\theta$ is increased, whereby $\cos \theta$ is increased. That is, in the case in which tensile force T having the same magnitude is generated by the support tether 50, support force that supports the first cushion 10 in the lateral direction, denoted by $T \cos \theta$, is increased as the other end of the support tether 50 is spaced apart from the first cushion 10 in the lateral direction.

In the case in which the other end of the support tether 50 is coupled to the seat at a position at which the other end of the support tether 50 is spaced apart from the first cushion 10 in the lateral direction, therefore, support force of the support tether 50 may be increased.

Specifically, the support tether 50 may extend from one end thereof, located at one side of the seat, in the lateral direction, and the other end of the support tether 50 may be coupled to the seat back frame F at the other side of the seat.

In particular, a first side panel S1 may be coupled to the seat back frame F. The first side panel S1 may extend forwards from one end of the seat back frame F such that the inflator 30 or the first cushion 10 is fixed to the first side panel S1. The support tether 50 may extend in front of the first side panel S1.

The first side panel S1 and a second side panel may be formed at opposite ends of the seat back so as to extend forwards. The inflator 30 and one end of the first cushion 10 may be fixed to the first side panel S1. The support tether 50 may extend rearwards from one end thereof, may be bent in front of the first side panel S1, and may extend between the seat back cushion C and the seat back frame F.

When the support tether 50 extends to the rear of the first side panel S1, the support tether 50 may be bent by the first side panel S1, whereby a fixing point of the support tether 50 may be formed at the first side panel S1 parallel to the extension direction of the first cushion 10. Consequently, the angle between the lateral direction of the first cushion 10 and the direction in which tensile force of the support tether 50 is applied approximates to 90 degrees, and therefore support force T cos θ approximates to 0 degrees. Consequently, the support tether 50 may extend in front of the first side panel S1.

In addition, when the support tether 50 extends between the seat back frame F and the seat back cushion C, whereby tensile force is generated by the support tether 50, the seat back cushion C may be moved forwards. Consequently, the fixing point of the support tether 50, formed as the result of the support tether 50 being bent by the seat back cushion C, may be moved forwards, whereby the angle between the lateral direction of the first cushion 10 and the direction in which tensile force of the support tether 50 is applied may be decreased, and therefore support force T cos θ may be increased.

In particular, a second side panel S2 may be formed at the seat back frame F. The second side panel S2 may extend forwards from the other end of the seat back frame F. The support tether 50 may be coupled to the second side panel S2 or the other end of the seat back frame F.

The support tether 50 may be a surface support tether extending in the forward-rearward direction or in the lateral direction and at the same time extending in the upward-downward direction. That is, the support tether 50 may be a surface support tether having a height in the upward-downward direction. Consequently, the support tether 50 may stably support the first cushion 10 while stably wrapping the seat back cushion C.

In addition, side airbags for vehicles according to the present invention may be disposed at opposite sides of the seat in a symmetrical fashion without a distinction between a chassis side and an interior side. Support tethers 50 included in the side airbags located at opposite sides may be disposed so as to overlap each other. In this case, the support tethers 50 may deviate from each other in the upward-downward direction so as not to interfere with each other at one side and the other side of the seat.

The first cushion 10 may be partitioned into a head protection portion 11 configured to protect the head of the passenger and a body protection portion 12 configured to protect the body of the passenger. The inflator 30 may be connected to the body protection portion 12 to supply gas to the first cushion 10.

The first cushion 10 may include a head protection portion 11 and a body protection portion 12 extending in the upward-downward direction. The head protection portion 11 may be a portion configured to cover the head of the passenger, and may protrude toward the passenger in order to block loading of the head of the passenger.

The body protection portion 12 may be located under the head protection portion 11 to cover the chest, the abdomen, and the pelvis of the passenger. The head protection portion 11 and the body protection portion 12 may be partitioned in the first cushion 10 as separate portions. The head protection portion 11 and the body protection portion 12 may be formed so as to be separated from each other in a portion and to communicate with each other in the remaining portion.

The inflator 30 may be located inside or outside the body protection portion 12, and may be connected to the body protection portion 12 in order to supply gas to the body protection portion 12. Consequently, the body protection portion 12 is deployed first, and then the head protection portion 11 may be deployed after a delay.

In another embodiment, a separate inner vent hole 40 may be further formed between the body protection portion 12 and the head protection portion 11 to allow the head protection portion 11 to start to be deployed after the body protection portion 12 is completely deployed.

As is apparent from the above description, in the side airbag for vehicles according to the present invention, the first cushion and the second cushion are rotated in the state of being interlocked by the support tether at the time of vehicle collision, whereby the first cushion and the second cushion are brought into tight contact with the passenger. Consequently, it is possible to effectively limit the behavior of the passenger to thus reduce injury of the passenger.

Although the preferred embodiments of the present invention have been described above with reference to the accompanying drawings, those skilled in the art will appreciate that the present invention can be implemented in various other embodiments without changing the technical ideas or features thereof.

What is claimed is:

1. A side airbag for vehicles, the side airbag comprising:
    a first cushion coupled to one side of a seat, the first cushion extending from a side surface of the seat in a forward-rearward direction to cover a passenger at a side of the passenger when deployed;
    an inflator fixed to the seat, the inflator being configured to supply gas to the first cushion such that the first cushion is deployed;
    a second cushion connected to the first cushion at a position at which the second cushion is spaced apart from the inflator in a forward direction, the second cushion being bent from the first cushion toward the passenger and extending in a lateral direction, the second cushion being deployed by the gas supplied from the first cushion; and
    a support tether having one end fixedly coupled to the second cushion and the other end fixedly coupled to the seat,
    wherein the support tether is bent so as to be slidably coupled to the first cushion between one end and the other end thereof.

2. The side airbag according to claim 1, wherein the support tether is slidably coupled to the first cushion at a position at which the support tether is spaced apart from the inflator in the forward direction.

3. The side airbag according to claim 1, further comprising:
a fastening tether having opposite ends integrally coupled to the first cushion,
wherein the support tether extends through a gap between the fastening tether and the first cushion so as to be slidably coupled to the first cushion between one end and the other end thereof.

4. The side airbag according to claim 3, wherein the fastening tether extends in an upward-downward direction, and an upper end and a lower end of the fastening tether are coupled to a side of the first cushion adjacent to the passenger.

5. The side airbag according to claim 1, further comprising:
a fastening ring fixedly coupled to a side of the first cushion adjacent to the passenger, the fastening ring having a sliding hole formed therein,
wherein the support tether extends through the sliding hole so as to be slidably coupled to the fastening ring.

6. The side airbag according to claim 1, wherein a blocking portion is formed at the support tether between one end and the other end thereof, the blocking portion being caught by the first cushion at a specific position to block sliding of the support tether in one direction.

7. The side airbag according to claim 6, wherein the blocking portion is a knot of the support tether formed so as to be caught by a sliding hole provided in the first cushion such that the support tether is slidable.

8. The side airbag according to claim 1, wherein the second cushion is bent from the first cushion along a bending line extending in an upward-downward direction, and the first cushion and the second cushion are separated from each other in a portion of the bending line.

9. The side airbag according to claim 1, wherein the second cushion communicates with the first cushion via a vent hole, and the second cushion is deployed by the gas supplied from the first cushion in a state in which the first cushion is completely deployed.

10. The side airbag according to claim 1,
wherein the seat comprises a seat back frame and a seat back cushion located in front of the seat back frame, and
wherein the support tether extends between the seat back cushion and the seat back frame so as to push the seat back cushion forwards when the first cushion is deployed.

11. The side airbag according to claim 10, wherein the support tether extends from one end thereof, located at one side of the seat, in the lateral direction, and the other end of the support tether is coupled to the seat back frame at the other side of the seat.

12. The side airbag according to claim 10, wherein a first side panel is coupled to the seat back frame, the first side panel extending forwards from one end of the seat back frame such that the inflator or the first cushion is fixed to the first side panel, and the support tether extends in front of the first side panel.

13. The side airbag according to claim 12, wherein a second side panel is coupled to the seat back frame, the second side panel extending forwards from the other end of the seat back frame, and the support tether is coupled to the second side panel or the other end of the seat back frame.

14. The side airbag according to claim 1,
wherein the first cushion is partitioned into a head protection portion configured to protect a head of the passenger and a body protection portion configured to protect a body of the passenger, and
wherein the inflator is connected to the body protection portion to supply gas to the first cushion.

* * * * *